US008938230B2

United States Patent
Yi et al.

(10) Patent No.: US 8,938,230 B2
(45) Date of Patent: Jan. 20, 2015

(54) METHOD OF COMMUNICATING BETWEEN A VEHICLE AND A TELEMATICS SUBSCRIPTION SERVICE

(75) Inventors: Ki Hak Yi, Windsor (CA); Kenneth L. Peirce, Grosse Pointe Farms, MI (US); Sethu K. Madhavan, Erie, PA (US); Andrew J. Macdonald, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 78 days.

(21) Appl. No.: 13/526,180

(22) Filed: Jun. 18, 2012
(Under 37 CFR 1.47)

(65) Prior Publication Data

US 2013/0337801 A1  Dec. 19, 2013

(51) Int. Cl.
*H04W 80/10* (2009.01)
*H04W 4/04* (2009.01)
*H04W 4/14* (2009.01)

(52) U.S. Cl.
CPC ............. *H04W 80/10* (2013.01); *H04W 4/046* (2013.01); *H04W 4/14* (2013.01)
USPC ...................... 455/426.1; 370/329; 455/404.1

(58) Field of Classification Search
CPC .................................................... H04W 80/10
USPC .............................................. 455/426.1, 517
See application file for complete search history.

(56) References Cited

U.S. PATENT DOCUMENTS

| | | | |
|---|---|---|---|
| 2007/0121641 A1* | 5/2007 | Hovey et al. ................ | 370/395.2 |
| 2007/0297598 A1* | 12/2007 | Kaneko et al. ................ | 379/372 |
| 2008/0209522 A1* | 8/2008 | Ephraim et al. .................. | 726/4 |
| 2008/0311937 A1* | 12/2008 | McNamara et al. ........... | 455/466 |
| 2009/0156213 A1* | 6/2009 | Spinelli et al. ................ | 455/436 |
| 2010/0185537 A1* | 7/2010 | Bari ................................ | 705/34 |
| 2010/0202368 A1* | 8/2010 | Hans ............................. | 370/329 |
| 2012/0014327 A1* | 1/2012 | Montemurro et al. ........ | 370/328 |
| 2012/0093069 A1* | 4/2012 | Karabinis ..................... | 370/315 |
| 2013/0035098 A1* | 2/2013 | Das et al. ................... | 455/435.1 |
| 2013/0230023 A1* | 9/2013 | Gray et al. ..................... | 370/331 |
| 2013/0244654 A1* | 9/2013 | Carmon et al. ............... | 455/436 |

* cited by examiner

*Primary Examiner* — Kashif Siddiqui
(74) *Attorney, Agent, or Firm* — Anthony Luke Simon; Reising Ethington P.C.

(57) ABSTRACT

A method of communicating between a vehicle and a telematics subscription service includes wirelessly linking a vehicle telematics unit to a session initiation protocol (SIP) proxy server; placing a telephone call from the vehicle telematics unit that is received by the SIP proxy server via the wireless link; establishing a SIP connection between the vehicle telematics unit and a telematics subscription service using the SIP proxy server in response to the placed telephone call; and communicating packetized data between the vehicle telematics unit and the telematics subscription service via the SIP connection.

17 Claims, 2 Drawing Sheets

METHOD OF COMMUNICATING BETWEEN A VEHICLE AND A TELEMATICS SUBSCRIPTION SERVICE

TECHNICAL FIELD

The present invention relates generally to vehicles and more particularly to communicating between a vehicle and a telematics subscription service.

BACKGROUND OF THE INVENTION

Modern vehicles frequently include vehicle telematics units that are capable of wirelessly communicating both voice and data between vehicles and central facilities. These communications involve wireless carrier systems and are frequently carried out using circuit-switched telephone calls. However, these and other types of telephone calls can pass through an increasing number of switches and/or telephony infrastructure before ultimately arriving at their destination. The increase in communication infrastructure complexity is often accompanied by an increase in transmission costs—an increase that can be amplified depending on other factors, such as whether the vehicle is operating on a roaming network or communicating both voice and data. This increase in complexity can also make the communications vulnerable to eavesdropping.

SUMMARY OF THE INVENTION

According to an aspect of the invention, there is provided a method of communicating between a vehicle and a telematics subscription service. The method includes wirelessly linking a vehicle telematics unit to a session initiation protocol (SIP) proxy server; placing a telephone call from the vehicle telematics unit that is received by the SIP proxy server via the wireless link; establishing a SIP connection between the vehicle telematics unit and a telematics subscription service using the SIP proxy server in response to the placed telephone call; and communicating packetized data between the vehicle telematics unit and the telematics subscription service via the SIP connection.

According to another aspect of the invention, there is provided a method of communicating between a vehicle and a telematics subscription service. The method includes wirelessly linking a vehicle telematics unit to a femtocell network, wherein the femtocell network comprises a session initiation protocol (SIP) proxy; receiving a telephone call at the femtocell network from the vehicle telematics unit; establishing an SIP connection between the femtocell network and a call center of the telematics subscription service in response to receiving the telephone call; and wirelessly communicating packetized data between the vehicle telematics unit and the call center via the femtocell network and the wireless carrier system using the SIP connection.

According to yet another aspect of the invention, there is provided a method of communicating between a vehicle and a telematics subscription service. The method includes establishing a short-range wireless communication link between a vehicle telematics unit and a base station of a wireless carrier system, wherein the base station of the wireless carrier system acts as a session initiation protocol (SIP) proxy for communicating between the vehicle telematics unit and a call center associated with a telematics subscription service; determining that the vehicle telematics unit is registered with the SIP proxy; receiving a telephone call at the SIP proxy from the vehicle telematics unit; establishing a communication session between the vehicle telematics unit and the call center in response to the received telephone call using SIP; and exchanging packetized data between the vehicle telematics unit and the call center using the established communication session.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

The method described herein can facilitate communications between a vehicle and a call center, which may be associated with a telematics subscriber service, using a short-range wireless communication link and session initiation protocol (SIP). The communications between the vehicle and the call center can be at least partially established between a vehicle telematics unit carried by the vehicle and an SIP proxy server via the short-range wireless communication link. The SIP proxy server can set up and control a SIP connection or communication session and can be recognized by a wireless carrier system using a unique identification number. The SIP proxy server can also be included with a base station of the wireless communication system, such as a cellular provider, or can be part of a femtocell network. The short-range wireless communication link can be established using the forward/reverse channels of known cellular technologies or other short-range wireless communication techniques. The SIP proxy server can direct communications between the vehicle telematics unit and the call center 20 through the SIP proxy server using SIP protocols. As part of the SIP connection between the vehicle and the call center, a virtual private network (VPN) can be established thereby encrypting communications over the connection. The VPN can reduce the possibility that communications between the vehicle and call center can be intercepted by third parties. While in the past multiple channels have been used to exchange data and voice communications, the SIP connection can enable both packet data transmissions and short message service (SMS) messages to be simultaneously transmitted between the vehicle and the call center over a single SIP channel. The packet data transmissions can also be used to carry voice communications as well. The call center can determine that sufficient infrastructure exists between itself and the vehicle to set up a SIP connection and a telephone call placed from a vehicle can be ended at the SIP proxy server in order to be carried out using the SIP connection.

Figure 1:
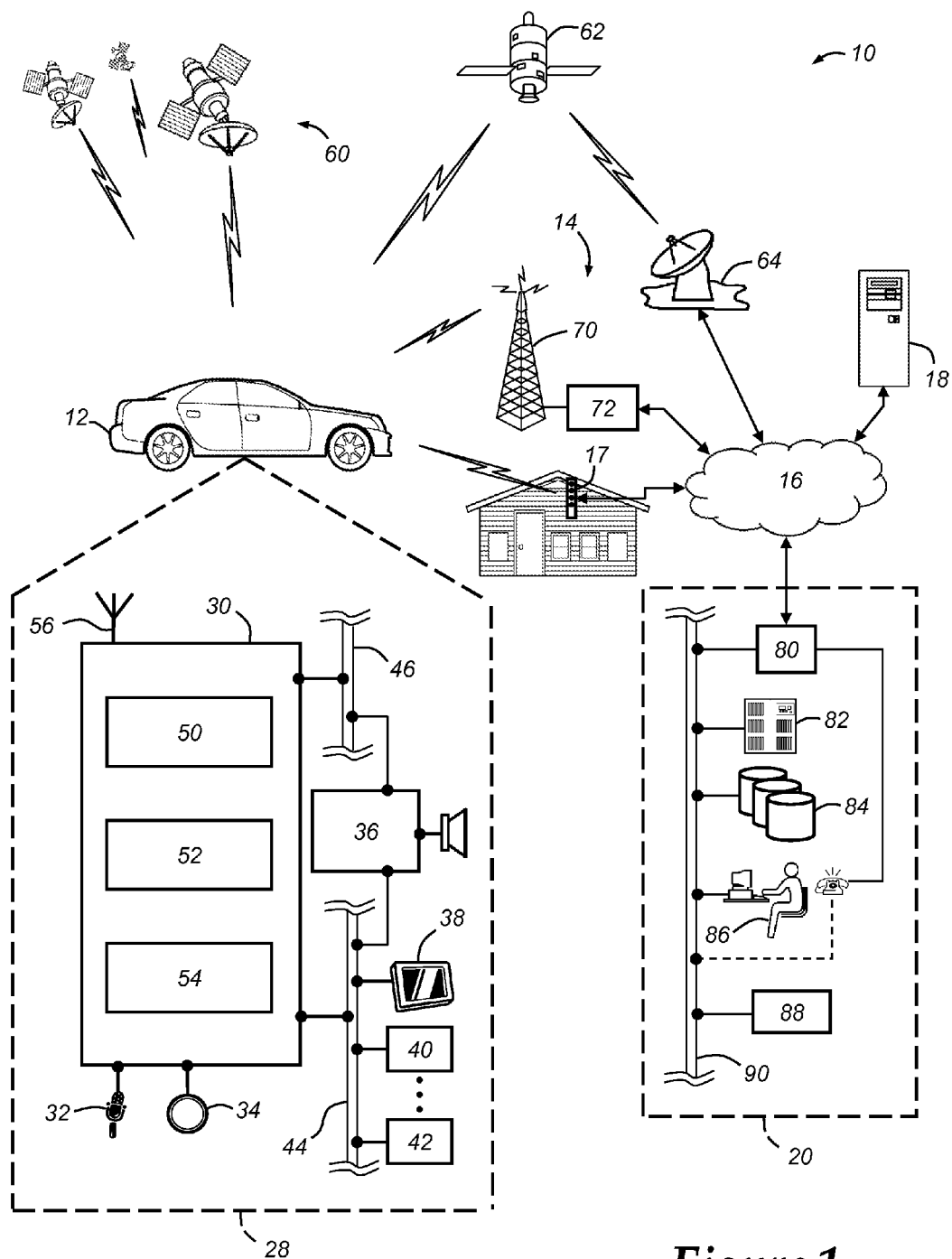
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a femtocell network 17, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs)

42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

One or more femtocell networks 17 may be communicatively linked to the wireless carrier system 14 and/or the land network 16. Femtocell networks 17 may be generally described as acting as a base station of the wireless carrier system 14. However, unlike the base station described above (e.g. cell tower 70), the femtocell network 17 may service a smaller area. And the manner in which the femtocell network 17 typically interacts with the wireless carrier system 14 can be different than that of the base station/cell tower 70. For instance, the femtocell network 17 can communicate with the wireless carrier system 14 through the land network 16 (as is shown in FIG. 1). Or the femtocell network 17 can wirelessly communicate with the wireless carrier system 14 via the cell tower 70. In one example, the femtocell network 17 may service an area having a diameter less than 50 meters (m). Moreover, the femtocell network 17 can be created using a wireless router that communicates with the wireless carrier system 14 via broadband Internet access found at a fixed location, such as a vehicle owner's home or place of employment. The femtocell network 17 shown in FIG. 1 is depicted as the residence of the vehicle owner. However, many other locations/buildings can also be used to implement the femtocell network 17. Also, it should be understood that the term "vehicle owner" should be broadly interpreted to not only encompass a person who holds legal title to a vehicle, but also other individuals or entities, such as individuals who regularly operate the vehicle and corporations that own or lease vehicles. The wireless router used with the femtocell network 17 can be communicatively linked to the broadband Internet access through Ethernet patch cables or other functionally similar means, such as a separate wireless router that is communicatively linked to the broadband Internet access. When the femtocell network 17 is linked to the broadband Internet access in such a manner, the femtocell network 17 can stand by to set up a short-range wireless link between the femtocell network 17 and the vehicle telematics unit 30. As envisioned here, the femtocell network 17 can also communicate with and be recognized by the wireless carrier system 14, such as through the land network 16 as shown in FIG. 1. One exemplary implementation of the femtocell network 17 is a device provided by Verizon Wireless that can be described as the 4G LTE Mobile Hotspot 4510L.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90 and can comprise at least part of a telematics subscription service in which subscription-based communications can be provided to a subscriber, such as a vehicle owner and/or operator. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
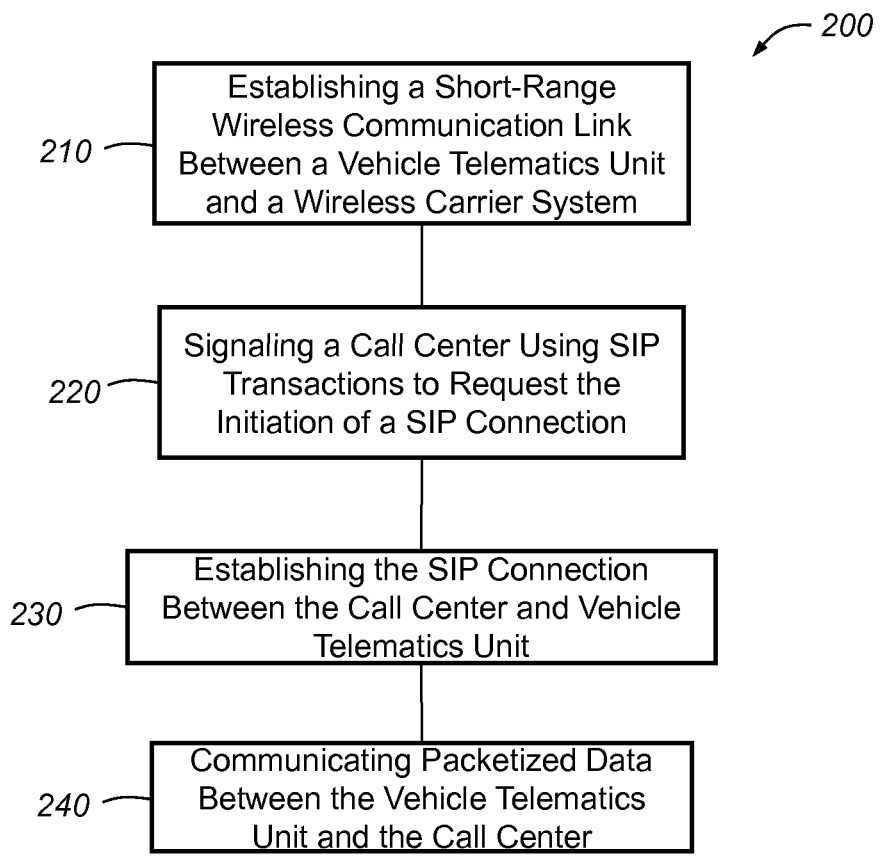
FIG. 2 is a flow chart depicting an exemplary embodiment of a method of communicating between a vehicle and a telematics subscription service.

Turning now to FIG. 2, there is shown an exemplary method 200 of communicating between the vehicle 12 and the call center 20, which can be part of a telematics subscription service. The method 200 begins at step 210 by establishing a short-range wireless communication link between the vehicle telematics unit 30 and the wireless carrier system 14. In one example, the short-range wireless communication link can be carried out between the vehicle telematics unit 30 and a base station of the wireless carrier system 14, such as cell tower 70. This link involves the exchange of information between the vehicle telematics unit 30 and the base station using radio frequency signals. The short-range wireless communication link can be understood with regard to one or more cellular protocols discussed above, such that the link comprises a forward channel/link and/or a reverse channel/link that at least partly sets up and carries out cellular telephone calls between the vehicle telematics unit 30 and the base station. Put differently, the short-range wireless communication link can be established at any place within a cell of the wireless carrier system 14 serviced by the base station or other such macrocell. In this case, the vehicle telematics unit 30 registers with the base station using the short-range wireless communication link, which can happen when the vehicle telematics unit 30 is powered or when it moves to within communication range of the base station.

In another example, the short-range wireless communication link can be established between the vehicle telematics unit 30 and the femtocell network 17. The short-range wireless link between the vehicle telematics unit 30 and the femtocell network 17 can be carried out using 802.11 wireless standards that are known by those skilled in the art. Also, the short-range wireless link between the vehicle telematics unit 30 and the femtocell network 17 can be carried out using the forward/reverse channel/link described with respect to the base station/cell tower 70 discussed above. The method 200 proceeds to step 220.

At step 220, the call center 20 determines whether a SIP connection is possible and, if so, requests initiation of a SIP connection or communication session between the vehicle telematics unit 30 and the call center 20. Regardless of whether the short-range wireless communication link is set up using the base station, such as cell tower 70, or the femtocell network 17, each of these elements can use SIP to set up and control communications between the vehicle telematics unit 30 and the call center 20 once the SIP connection is established. SIP can generally be described as a signaling protocol that operates on the application layer of a protocol stack and controls communication sessions over Internet Protocol (IP). In operation, SIP can facilitate the packetized exchange of data that establishes various communications capabilities, such as voice and data transmissions. The SIP connection can involve a Session Initiation Protocol User Agent (SIP UA) and an SIP proxy server. Here, the base station or the femtocell network 17 can comprise one SIP UA while the call center 20 can comprise another SIP UA. It should be appreciated that in some implementations an SIP UA can act as both a client and an SIP proxy server. While communications are ultimately carried out between the vehicle telematics unit 30 and the call center 20, the SIP connection may exist between the base station/femtocell network 17 and the call center 20. As a result, the base station/femtocell network 17 can be described as an end node of the SIP connection much like the call center 20 can be described as another end node.

In this arrangement, the base station (e.g. cell tower 70) or femtocell network 17 can include the SIP proxy server. The SIP proxy server can act as an intermediary located between the vehicle telematics unit 30 and the call center 20. To function in such a way, the SIP proxy server can be assigned an identifier, such as a Mobile Identification Number (MIN), a Mobile Dialed Number (MDN), or an International Mobile Subscriber Identifier (IMSI) with which the call center 20—and ultimately the wireless carrier system 14—can identify the base station/femtocell network 17. That is, the wireless carrier system 14 can identify the SIP proxy server using a unique MIN/MDN/IMSI that is separate from the MIN/MDN/IMSI associated with the vehicle telematics unit 30. In addition, the wireless carrier system 14 and/or the call center 20 can signal the SIP proxy server to determine whether or not the vehicle telematics unit 30 is registered with or "camped on" that particular server. As a result, it is possible to determine whether or not the call center 20 (or other party) can establish a SIP connection with the vehicle 12.

The SIP proxy server in this method 200 can implement a "soft switch" to carry out its functions. Broadly speaking, the soft switch enables IP to IP calls or other packetized communication between the vehicle telematics unit 30 and call center 20, such as the simultaneous transmission of voice calls and SMS messages. Signaling that takes place as part of the SIP connection can originate from the base station of the wireless carrier system 14 or the femtocell network 17 and can be used to initiate communications between the vehicle telematics unit 30 and the call center 20. An acknowledgement of the signaling from the call center 20 can be received at the base station or the femtocell network 17.

The soft switch can set up the SIP connection over a packet data switched network (PSDN). In some implementations, the SIP proxy server can establish a virtual private network (VPN) with the call center 20 over the PSDN as part of the SIP connection. In one implementation, the call center 20 sends messages to the wireless carrier system 14 to obtain the identifier of the base station/femtocell network 17, such as the MIN/MDN/IMSI discussed above. Using the identifier, the call center 20 can determine whether the base station/femtocell network 17 can carry out a SIP connection. If the vehicle telematics unit 30 is in wireless communication with the base station/femtocell network 17, the vehicle telematics unit 30 can place a voice telephone call from the vehicle 12, such as to the call center or to the base station/femtocell network 17. This call can be received by the base station/femtocell network 17 if the vehicle 12 called the MIN/MDN/IMSI of the base station/femtocell network 17 or if the vehicle called the call center 20, in which case the base station/femtocell network 17 can intercept the call. In either case, the voice telephone call can be terminated by the base station/femtocell network 17. The method 200 proceeds to step 230.

At step 230, the SIP connection is established with the call center 20. The SIP connection can be established between the base station and the call center 20 or the femtocell network 17 and the call center 20 for communications between the vehicle telematics unit 30 and call center 20. After the voice telephone call placed during step 220 is terminated, communications between the vehicle 12 and the call center 20 (or other party) can be carried out using the SIP connection. In one implementation, the call center 20 can direct the vehicle telematics unit 30 to communicate using the SIP connection by generating a unique tone. Upon receiving the unique tone, the telematics unit 30 can recognize it as an instruction to communicate using the SIP connection. Communications between the vehicle telematics unit 30 and the call center 20 can be carried out through the SIP proxy server. Using the unique MIN/MDN/IMSI, the SIP proxy server can act as an end node for communications between itself and the call center 20. When the SIP proxy server receives communications from the call center 20, it can transmit those communications to the vehicle telematics unit 30 over the short-range wireless communications link between the base station/femtocell network 17 and the vehicle telematics unit 30. Communications from the vehicle telematics unit 30 intended for receipt by the call center 20 can be sent from the vehicle telematics unit 30 to the SIP proxy server, which then transmits the communications to the call center 20. The communications between the SIP proxy server and the call center 20 can be sent as packetized data or SMS messages, the transmission of which can be governed by SIP. The method 200 proceeds to step 240.

At step 240, packetized data is communicated between the vehicle telematics unit 30 and the call center 20 using the established SIP connection. The established SIP connection can involve wirelessly receiving packetized data from the vehicle telematics unit 30 intended for the call center 20 via the base station of the wireless carrier system 14 or femtocell network 17. After receiving the unique tone, the vehicle telematics unit 30 can not only recognize it as an instruction to communicate using the SIP connection, but also as an instruction that the simultaneous communication of SMS and packetized data is possible. The packetized data can also include vehicle data, which can be related to the operation and/or function of the vehicle 12. In another example, the packetized data can be used to carry out voice communications simultaneously with SMS and other data (e.g., vehicle data). In one example, the vehicle telematics unit 30 can initiate a voice call to the call center 20 by using the short-range wireless communications link to the SIP proxy server. The SIP proxy server can receive the voice telephone call because the call is directed to the SIP proxy server's MIN/MDN or the SIP proxy server can intercept the voice call originating from the vehicle. In either case, the SIP proxy server can then establish a SIP connection between the base station/femtocell network 17 and the call center 20. When the vehicle telematics unit 30 expects to receive voice communications from the call center 20, the wireless carrier system 14 can route such communications to the SIP proxy server using the MIN/MDN of the SIP proxy server, which can thereby send the voice communications to the vehicle telematics unit 30 over the short-range wireless communication link. In another example, the SIP proxy server can also simultaneously facilitate communication of SMS messages between the vehicle telematics unit 30 and the call center 20 using the SIP connection. The SMS messages can be routed to/from the vehicle telematics unit 30 through the SIP proxy using its MIN/MDN for routing purposes with respect to the wireless carrier system 14. The call center 20 can send and receive SMS messages to/from the vehicle telematics unit 30 using the SIP proxy and its associated MIN/MDN for routing purposes. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communicating between a vehicle and a telematics subscription service, comprising the steps of:
   (a) wirelessly linking a vehicle telematics unit to a session initiation protocol (SIP) proxy server comprising a femtocell network that is assigned a mobile identification number (MIN), a mobile dialed number (MDN), or an international mobile subscriber identifier (IMSI);
   (b) placing a telephone call from the vehicle telematics unit that is received by the SIP proxy server via the wireless link;
   (c) establishing a SIP connection between the vehicle telematics unit and a telematics subscription service using the SIP proxy server in response to the placed telephone call, wherein the SIP proxy server is located apart from both the vehicle telematics unit and the telematics subscription service; and
   (d) communicating packetized data between the vehicle telematics unit and the telematics subscription service via the SIP connection.

2. The method of claim 1, further comprising the step of terminating the telephone call before establishing the SIP connection.

3. The method of claim 1, wherein the SIP proxy server simultaneously communicates short message service (SMS) messages and packetized data between the telematics subscription service and the call center.

4. The method of claim 1, further comprising the step of establishing a virtual private network (VPN) as part of the SIP connection.

5. The method of claim 1, further comprising the step of wirelessly linking the vehicle telematics unit to a wireless carrier system using a short-range wireless communication link.

6. The method of claim 5, wherein step (a) further comprises the step of establishing the short-range wireless communication link via a forward channel or reverse channel using one or more cellular communication protocols.

7. A method of communicating between a vehicle and a telematics subscription service, comprising the steps of:
   (a) wirelessly linking a vehicle telematics unit to a femtocell network, wherein the femtocell network comprises a session initiation protocol (SIP) proxy;
   (b) receiving a telephone call at the femtocell network from the vehicle telematics unit via a mobile identification number (MIN), a mobile dialed number (MDN), or an international mobile subscriber identifier (IMSI) that is assigned to the femtocell network;
   (c) establishing an SIP connection between the femtocell network and a call center of the telematics subscription service in response to receiving the telephone call; and
   (d) wirelessly communicating packetized data between the vehicle telematics unit and the call center via the femtocell network and the wireless carrier system using the SIP connection.

8. The method of claim 7, further comprising the step of communicatively linking the femtocell network to a broadband Internet service.

9. The method of claim 8, wherein the femtocell network is linked to broadband Internet service located at a vehicle owner's residence or business location.

10. The method of claim 7, wherein the femtocell network provides service to an area less than fifty meters in diameter.

11. The method of claim 7, further comprising the step of wirelessly linking the vehicle telematics unit to the femtocell network using a short-range wireless communication link.

12. The method of claim 7, further comprising the step of establishing a virtual private network (VPN) as part of the SIP connection.

13. The method of claim 7, further comprising the step of wirelessly communicating packetized data that relates to the operation of a vehicle via the SIP connection.

14. The method of claim 7, further comprising the step of simultaneously communicating packetized data and short message service (SMS) messages.

15. A method of communicating between a vehicle and a telematics subscription service, comprising the steps of:
   (a) establishing a short-range wireless communication link between a vehicle telematics unit and a base station of a wireless carrier system, wherein the base station of the wireless carrier system acts as a session initiation protocol (SIP) proxy for communicating between the vehicle telematics unit and a call center associated with a telematics subscription service and is assigned a mobile identification number (MIN), a mobile dialed number (MDN), or an international mobile subscriber identifier (IMSI);
   (b) determining that the vehicle telematics unit is registered with the SIP proxy;
   (c) receiving a telephone call at the SIP proxy from the vehicle telematics unit;
   (d) establishing a communication session between the vehicle telematics unit and the call center in response to the received telephone call using SIP; and
   (e) exchanging packetized data between the vehicle telematics unit and the call center using the established communication session.

16. The method of claim 15, further comprising the step of establishing a virtual private network (VPN) as part of the communication session.

17. The method of claim 15, further comprising the step of sending a unique tone to the vehicle telematics unit that instructs the vehicle telematics unit to use the SIP connection to simultaneously communicate short message service (SMS) messages and packetized data.

* * * * *